United States Patent Office 3,403,798
Patented Oct. 1, 1968

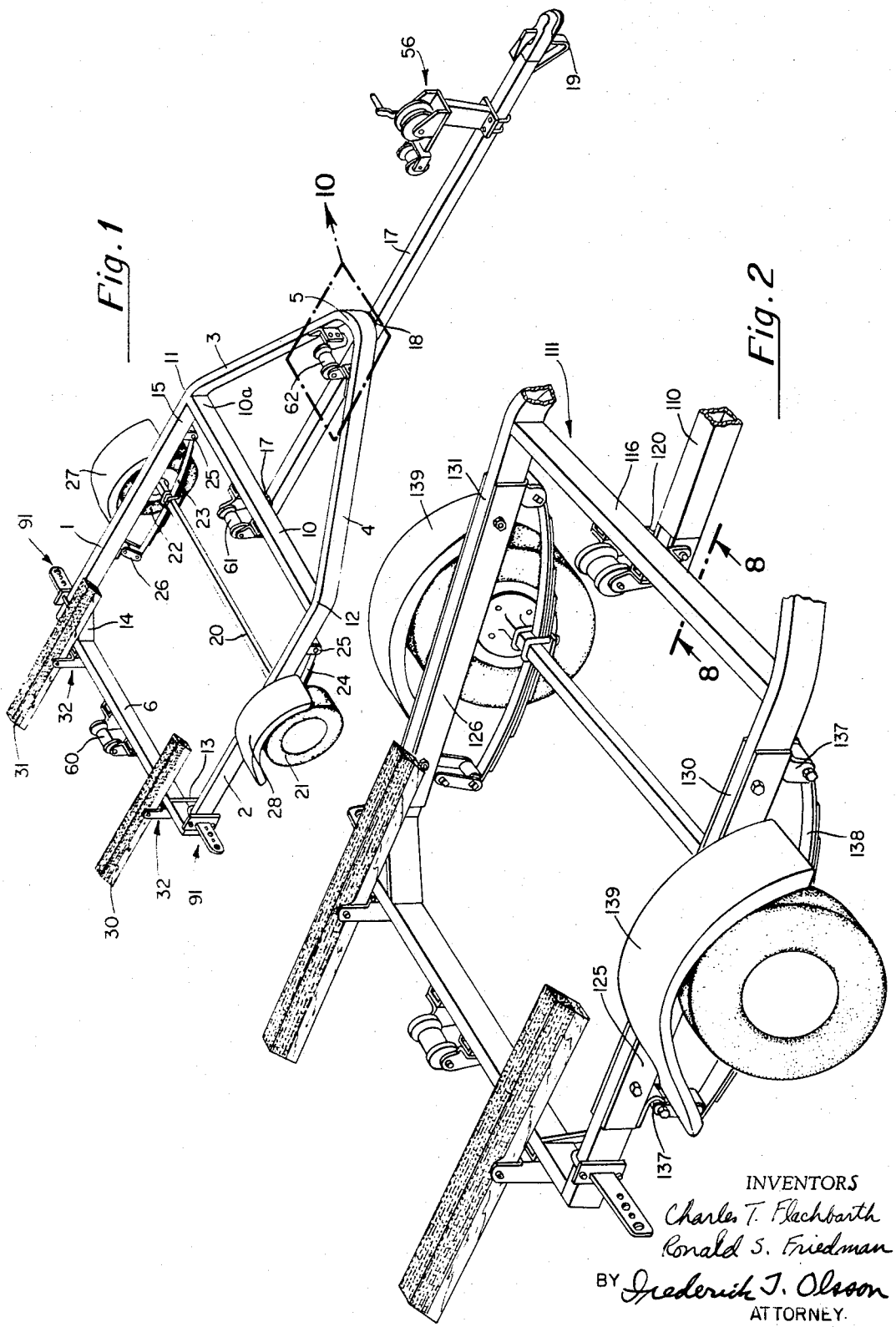

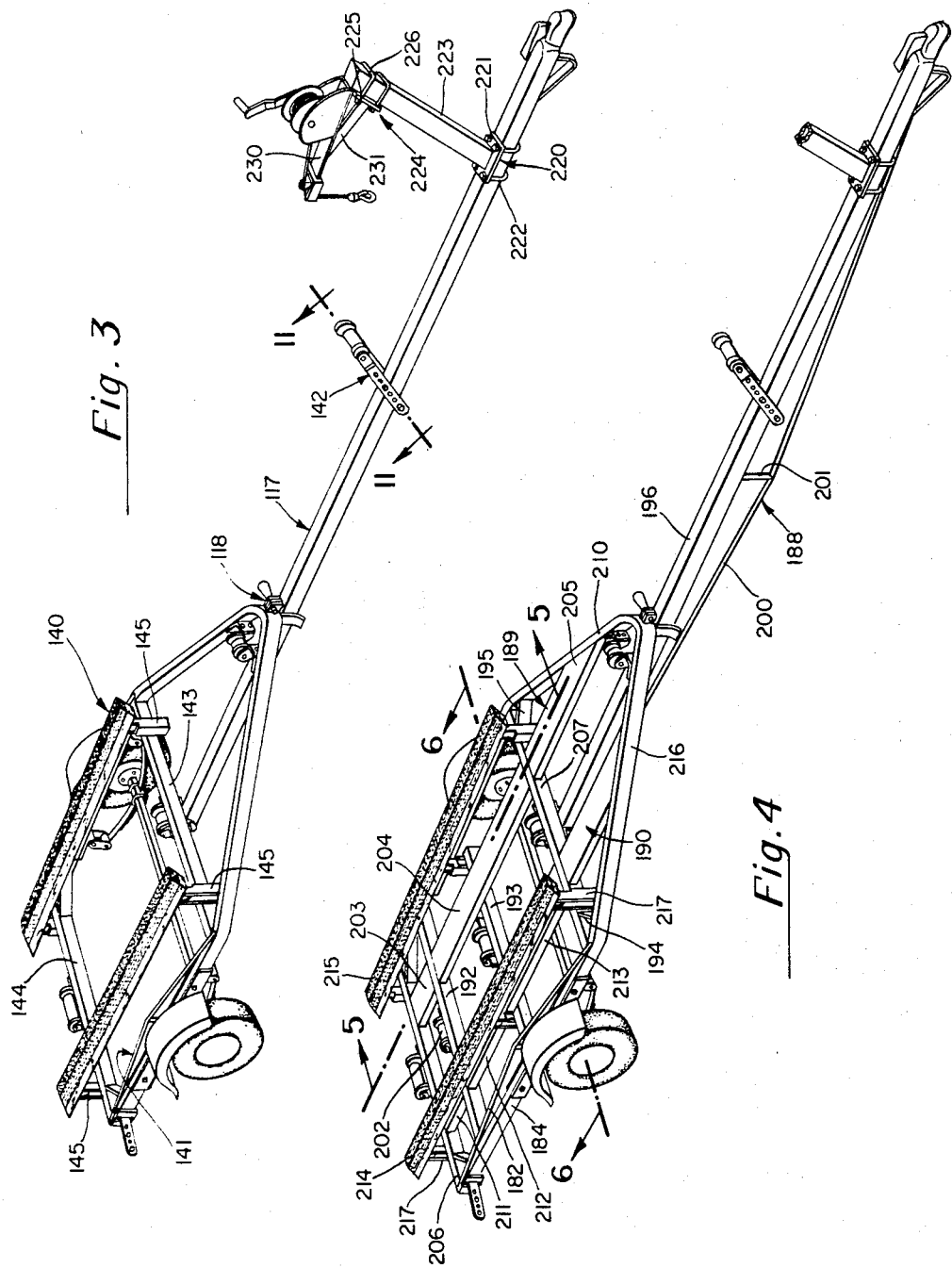

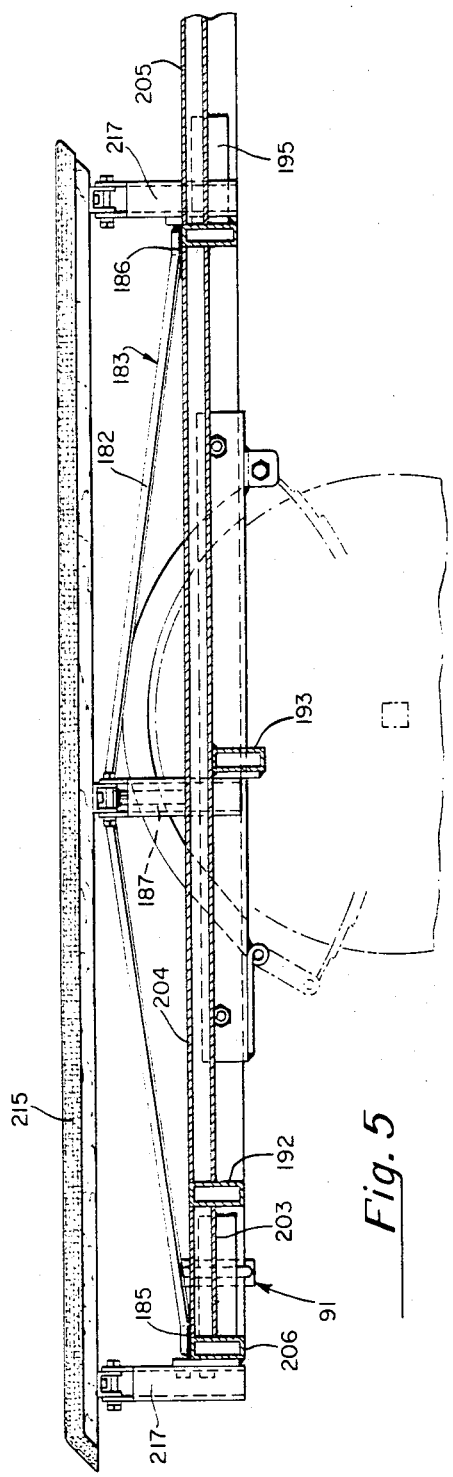
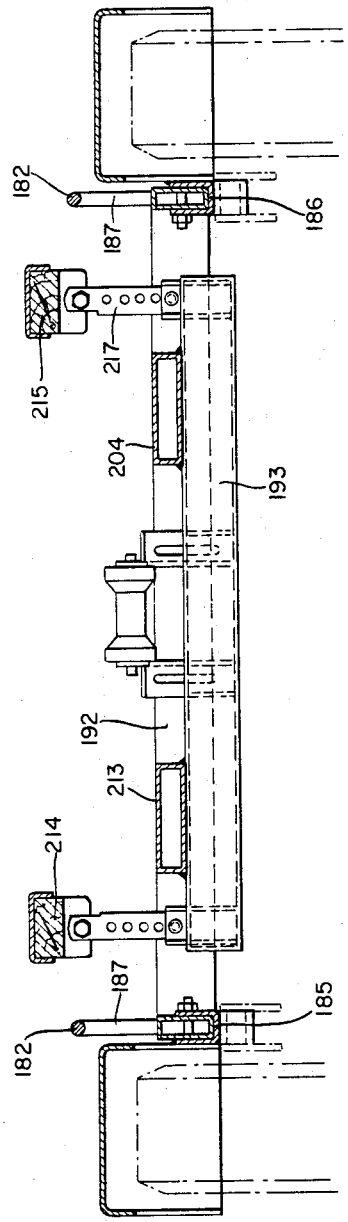

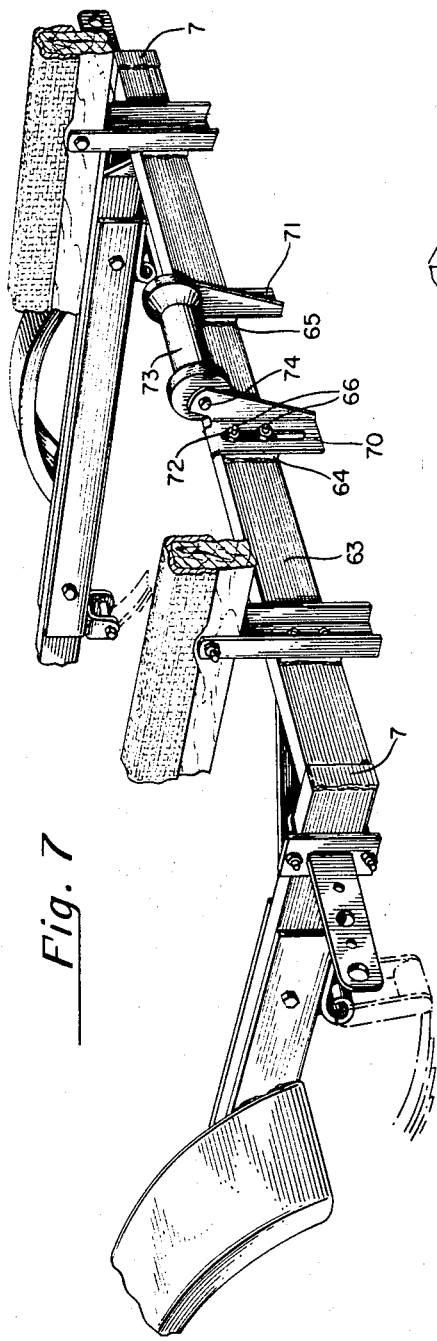
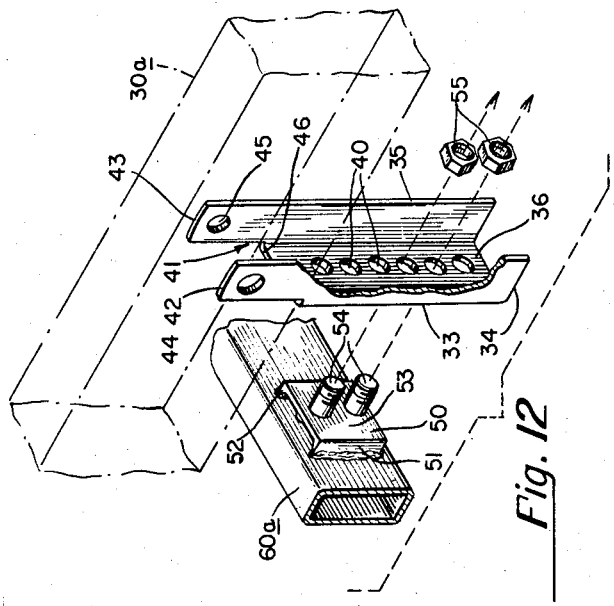
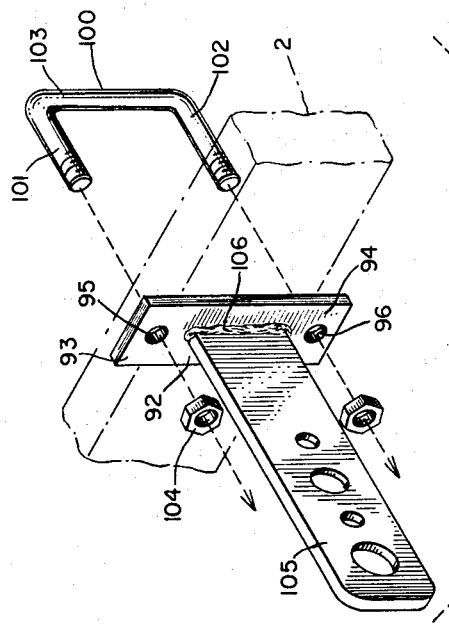

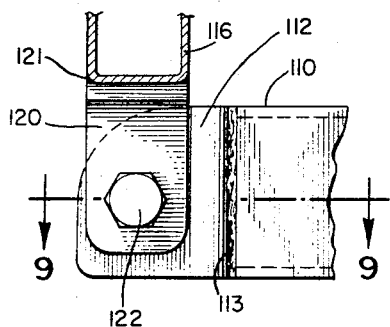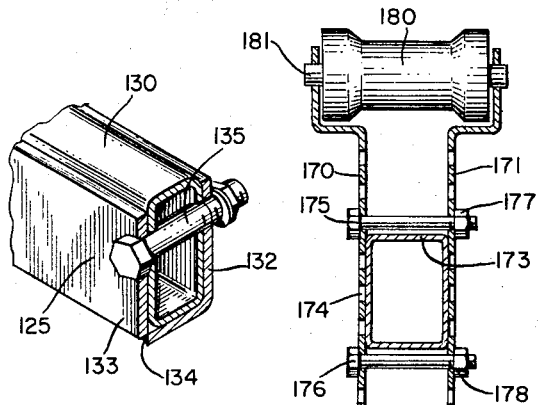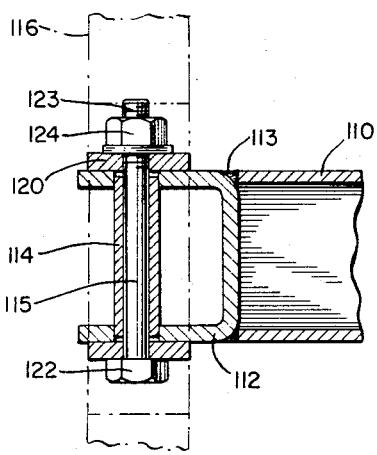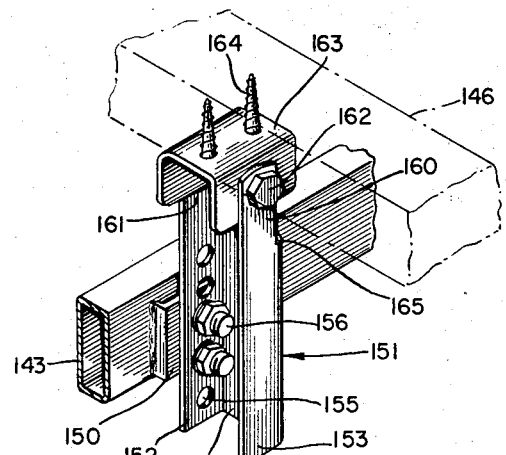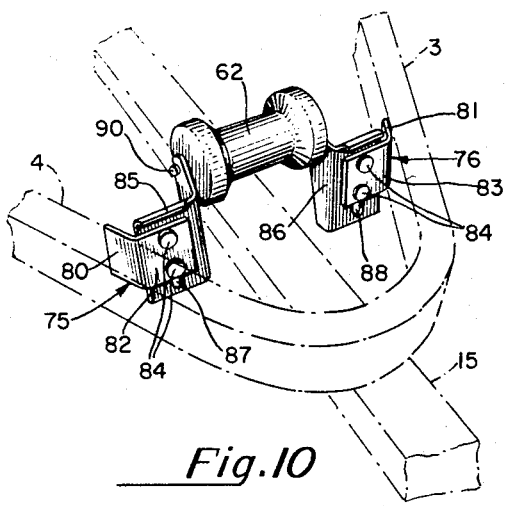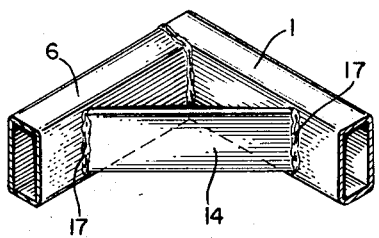

3,403,798
BOAT TRAILERS
Charles T. Flachbarth and Ronald S. Friedman, Parkersburg, W.Va., assignors to Textron, Inc., Providence, R.I., a corporation of Rhode Island
Filed Jan. 10, 1966, Ser. No. 519,494
11 Claims. (Cl. 214—84)

ABSTRACT OF THE DISCLOSURE

The invention relates to boat trailers having framing made of rectangular shaped tubing whose cross section is matched to the load and with the various side members, keel members, stiffeners, bridge assemblies, and cross members abutted and welded to maximize joint strength.

---

This invention relates to trailers of the kind adapted to be hauled behind a truck or pleasure car for transporting small boats; for example, boats in the order of 8 to 30 feet in length and 200 to 7,500 pounds in weight.

In one aspect the invention contemplates boat trailers of the kind in question having certain novel structural features which are especially arranged and adaptable for combining into a variety of trailers of differing sizes and capacities and providing for a family of trailers each having common design characteristics contributing to maximum operational performance and minimum cost.

In another aspect the invention contemplates a boat trailer having novel structural features which provide a trailer of optimum design; that is, a trailer having a minimum number of parts with the parts being of minimum size and shape and so correlated and cooperating with each other to substantially reduce the over-all weight and physical size of the trailer yet providing the requisite rigidity for maximum functional performance under the severest of operating conditions.

In another aspect the invention contemplates boat trailers of the kind in question having novel structural arrangements which permit maximum functional performance of the trailer under all of the wide variety of operational conditions imposed through loading, unloading, running, handling, and the like.

In another aspect the invention contemplates certain structural features which can be used in various combinations to provide a family of trailers from relatively small to large sizes, these structural features enabling the trailer components to be of minimum size and of simple form and coordinated with each other in a manner to obtain maximum strength characteristics for the various running and loading conditions encountered in trailer operation.

In another aspect the invention contemplates a boat trailer having a minimum number of parts with the parts being of minimum size and shape and being of relatively simple geometric form and correlated in a manner to greatly simplify fabrication of the trailer assembly, the minimal characteristics of the parts and the simplification of fabrication greatly reducing manufacturing costs to thereby provide a low cost, high performance trailer.

Furthermore the invention contemplates certain novel structural features combinable in a manner to provide for a family of trailers ranging from relatively small to large size, the structural features as embodied in different sizes having certain common design characteristics which are especially conducive for the application of automation techniques in the fabrication of the various components and thereby effecting savings in manufacturing cost.

Thus, one of the prime objectives of the invention is to provide a family of trailers each comprised of easy-to-fabricate components having design characteristics which are advantageously and economically employed in fabrication for cost reduction and employed in the trailer assemblies to obtain maximum functional and operational performance.

The nature and details of the invention will be described below in connection with the following drawings wherein:

FIGURE 1 is a perspective view of a trailer incorporating certain features of the invention, the trailer being of the low capacity range, for example for transporting boats up to 1,100 pounds;

FIGURE 2 is a perspective view with certain parts omitted of a trailer incorporating certain features of the invention, the trailer being of a larger capacity than the trailer of FIGURE 1, for example to transport boats up to 1,500 pounds;

FIGURE 3 is a perspective view of another trailer incorporating certain features of the invention, the trailer being one of the intermediate range, for example to carry boats up to 1,800 pounds;

FIGURE 4 is a perspective view of a trailer incorporating various features of the invention, the trailer being designed to carry boats up to 2,500 pounds;

FIGURE 5 is a sectional elevational view taken along the lines 5—5 in FIGURE 4 and illustrating various components of the trailer frame;

FIGURE 6 is a sectional elevational view taken along the lines 6—6 in FIGURE 4 and illustrating various components of the trailer frame;

FIGURE 7 is a view taken from the rear of the trailer of FIGURE 2 and illustrating certain components of the trailer frame;

FIGURE 8 is a view taken along the lines 8—8 in FIGURE 2 and illustrating the manner in which the tongue is pivotally connected to the frame;

FIGURE 9 is a plan sectional view taken along the lines 9—9 in FIGURE 8;

FIGURE 10 is a fragmentary perspective view of the section designated at 10 in FIGURE 1;

FIGURE 11 is an elevational sectional view taken along the lines 11—11 of FIGURE 3 and illustrating the manner of connecting a roller to the tongue;

FIGURE 12 is a perspective view illustrating the manner in which the bunk supports of the trailers in FIGURES 1 and 2 are mounted;

FIGURE 13 is a perspective view illustrating the manner in which the bunk supports of the trailers of the FIGURES 3 and 4 are mounted;

FIGURE 14 is a fragmentary perspective view illustrating the manner of attaching the running gear to the frame;

FIGURE 15 is an exploded view illustrating the structure of the tail light support and the manner of securing the same to the frame; and FIGURE 16 is a fragmentary perspective view illustrating the manner of tying certain frame components together with stiffeners.

In FIGURE 1 the trailer frame includes a pair of side sections 1 and 2 which extend parallel to one another, a pair of leg sections 3 and 4 which extend respectively away from one end of the side sections. The legs are angularly oriented toward one another and are joined together at an apex area generally designated at 5.

The frame further includes a rear keel member 6 which is disposed at the aft of the frame and extends between the side sections 1 and 2, together with a forward keel member 10 extending between the side sections, the ends of the forward keel member engaging the side sections respectively at the junctures 11 and 12 between the side sections and the leg sections. The basic frame structure further includes stiffener members 13 and 14 which are respectively disposed at the intersection of said side sections and the rear keel member.

The shape or form of the side sections, the leg sections, and the keel members in conjunction with the manner in which the keel members and the stiffener are secured is an important part of the invention.

The side sections, leg sections, and keel members are all formed from hollow rectangular shaped metal tubing. Preferably the metal used is steel. The use of rectangular tubing is advantageous because of its resistance to torsion and flexure forces both static and transient in character. Such forces commonly are imposed on trailers under loaded and/or running conditions, and in a great majority of instances such forces are of substantial magnitudes.

Furthermore, the rectangular shape is of special advantage in that it provides for structures to engage in a manner conducive to high strength welding. The vertically oriented side surfaces of the sections 1 and 2 are substantially flat, for example the inside surface 15 of side section 1. The keel members are cut so that their ends are square and thereby make a desirable fit with the flat surfaces; thus, as indicated in FIGURE 1, when the end 10a of the keel member 10 is engaged with the surface 15 the joint presents a structure which permits high strength welding. The welding is effected around the periphery of the keel member. The other ends of the keel members 6 and 10 are welded to the side surfaces in the manner described.

In connection with the rear keel member 6 it is pointed out that the ends of the member abut the side sections 1 and 2 on the inside surfaces thereof. The keel members do not overlap the edges of the side sections. This structure is preferred and is advantageous because the rear keel member is used as a support for the keel rollers and the bunk bar supports as will be described later. The loading on the rear keel member tends to rotate the same. The manner of abutting and welding the keel member augments the resistance of the rectangular shape against rotation and imparts considerable stiffness to the keel member and hence minimizes the effects of torsion forces.

With respect to the joints above described, it is preferred that the side sections be provided with end caps, such as the caps 7 and 8 in FIGURE 7 which are welded to the ends of the side sections or attached by other conventional means.

Stiffener plates 13 and 14 serve an important function in the frame structure. First of all the stiffeners are plate-like and their edges are cut square to make a substantial line contact with the surfaces of the keel member and side section. This presents an intersecting structure which permits an optimum weld. See FIGURE 16 where the welds 17 connect the stiffener 14 to side section and keel member 6. Further, the line contact of the stiffener with the surface provides a type contact which will resist rotation of the keel member.

Another important function of each stiffener is to serve as a load transfer medium as between the keel member and side section and thereby desirably eliminate forces on the joint between the keel member and the side sections. For example, in those instances under running conditions where the trailer wheel encounters a hole or a rut, the wheel may be momentarily unsupported, and there is a transfer of load from the unsupported side to the other. The stiffeners share in the transfer and thereby reduce the amount of load on the corner joint.

In the frame, the side sections and the leg sections are all formed from a single piece of rectangular shaped hollow metal tubing. The keel members are formed from the same tubing. This minimizes the kinds of raw materials needed for component fabrication.

It is contemplated that such tubing be made as by taking coils of rolled strip, forming the same into a welded seam circular tube, and then reforming into the desired rectangular shape and cut to desired length. This type of operation is done automatically, which in high volume production makes for savings in fabrication costs. Further the tubes for making the various sizes of frames and keel members are cut to predetermined length, and this is especially useful for inventory purposes.

The use of a single tubular member for the side and leg sections of the frame is of advantage because the same is quickly and easily formed into the shape illustrated with conventional tools. Furthermore, the unitary arrangement of the side and leg sections and the unitary arrangement of the keel members is especially adaptable for rapid assembly, as for example by the techniques described in our copending application filed concurrently herewith and entitled "Improvements in Boat Trailer Fabrication."

In FIGURE 1 the trailer tongue is indicated at 16. The tongue extends from the forward keel member 10 adjacent the apex area 5 and thence outward of the frame. In the embodiment shown the tongue is fixedly connected with the frame, for example as by being welded to the forward keel member 10 as indicated at 17 and also welded at the apex area 5 as indicated at 18. The invention contemplates that the tongue be pivotably connected with the frame and this will be explained in connection with the description of the trailers of larger capacity. A skid 19 is secured to the forward end of the tongue.

The running gear for the trailer of FIGURE 1 includes the axle 20, the wheels 21 and 22, and the leaf springs 23 and 24. The leaf springs are respectively connected to the side sections 1 and 2 as by the conventional channels 25 and yokes 26. The mud guards 27 and 28 are disposed over the wheels 21 and 22 and are respectively welded to the side sections 1 and 2.

In FIGURE 1 the bunk bars are indicated at 30 and 31. The bunk bars are mounted by identical supports 32. The structure of the supports 32 is an important part of the invention and will be described in connection with FIGURE 12.

In FIGURE 12 the bunk bar is shown in phantom lines indicated at 30a and a fragmentary section of the rear keel member is indicated at 6a. A channel shaped piece 33 has legs 34 and 35 and bridge 36. The bridge 36 has a plurality of apertures 40. The channel is cut away as indicated at 41 so that the legs form the support arms 42 and 43. As shown, the bunk 30 is disposed between the support arms. The arms 42 and 43 have apertures 44 and 45 through which extend bolt means (not shown) which pivotably connect the bunk bar to the support. It will be observed that the apertures 44 and 45 are offset from the plane of the bridge 36.

Also it will be noted that the terminus 46 of the cut away section is disposed with relation to the apertures 44 and 45 so that it operates as an abutment against rotation of the bunk bar counter-clockwise (as viewed looking toward the right in FIGURE 12). The arrangement provides that when the bunk bar engages the abutment 46, the bunk bar is in a substantially horizontal position.

This controlling of the rotation of the bunk bar is utilized to advantage in hauling a boat upon the trailer.

The channel piece 33 is mounted on the rear keel member as follows. A channel 50 has legs 51 and 52 and a bridge 53. The heads of weld studs 54 are welded to the underside of the bridge 53 and the threaded portions of the studs protrude through appropriate apertures in the bridge. The legs 51 and 52 of the channel engage the side surface of the keel member 6 in a line contact and are welded to the keel member along the area of contact.

The apertures 40 accommodate the studs 54 and provide for vertical adjustment of the support. When the channel piece 33 is mounted on the channel 50, the bridges 36 and 53 are tightly engaged. This engagement is held by a conventional fastening arrangement; for example, a flat washer, an external-internal washer, and a nut such as indicated at 55.

The above described arrangement for mounting the bunk bars is used in both the trailer embodiments of FIGURE 1 and FIGURE 2 and has several substantial advantages as noted below.

First, the welds securing the channel 50 to the rear keel member extend substantially over the full width of the side of the keel member, and this distributes the load imposed over a larger area and hence avoids stress concentration. In addition, the channel and its welding arrangement enables a connection with the keel member without necessitating the forming of any holes and therefore avoiding stress concentrations. In addition the channel is oriented vertically so that the space between the side of the keel member and the bridge 53 of the channel is open to provide for good drainage. Another substantial advantage is the economy of labor savings in assembly. The use of the weld studs 54 makes for extremely easy vertical adjustment of the support.

The channel members 33 and 50 are fabricated from commercial stock parts which can be purchased in quantity and in a wide variety of sizes and shapes. The fabrication of the channel 33 is relatively simple, consisting primarily of cutting the stock to length and blanking the cut out section and the various apertures. The fabrication of the channel piece 50 is along the same lines, namely cutting to length, forming the apertures, and welding on the studs. All of this is accomplished with conventional tools and jigs.

Furthermore the simplicity of the shape of these channel pieces makes for very rapid incorporation into the trailer assembly with consequent savings in labor.

The tongue 17 in FIGURE 1 carries a winch generally indicated at 56, and the structure for supporting the winch will be described later.

The trailer embodiment of FIGURE 1 includes rollers for engaging the keel of the boat and are used in the conventional manner in the loading and unloading operation and for providing boat support during running.

The rollers 60 and 61 are respectively supported on the rear keel member 6 and the forward keel member 10. The roller 62 is supported at the apex area of the frame.

The means for supporting the rollers 60 and 61 are identical in structure. This same structure is used to support corresponding rollers in the trailers of FIGURES 2, 3, and 4. The roller support structure is somewhat along the lines of the bunk support structure previously described and has the same advantages. The roller support structure will be described in connection with FIGURE 7.

In FIGURE 7 the rear keel member 63 carries 2 channel pieces 64 and 65 which are identical to the channel piece 50 described in connection with FIGURE 12. Each of the channel pieces has weld studs 66 which are the same as the weld studs 54 of FIGURE 12.

The channel piece 64 carries a roller bracket 70, and the channel piece 65 carries a roller bracket 71. A conventional nut and washer arrangement such as indicated at 72 holds the roller brackets firm against the bridges of the channel pieces 64 and 65. The roller 73 is disposed between the brackets 70 and 71 and are rotatably supported as by the bearings 74.

The roller 62 is supported on the frame by an arrangement which is shown in FIGURE 10. In FIGURE 10 a pair of L-shaped brackets 75 and 76 are respectively disposed on the leg sections 3 and 4. The feet 80 and 81 of the brackets are welded to the inner sides of the sections 3 and 4. The legs 82 and 83 extend outwardly toward each other and lie substantially in the same plane. Each leg carries a plurality of weld studs 84 which are similar to the weld described in FIGURE 12. The weld studs carry roller brackets 85 and 86 which are provided with slots 87 and 88 accommodating the studs. The slots 87 and 88 formed in the roller brackets provide for vertical adjustment. Appropriate nut and washer means are used on the studs to secure the brackets to the legs. The roller 62 is disposed between the roller brackets and is rotatably mounted as by the bearings 90.

With respect to the arrangement for supporting the rollers on the keel members and the roller at the apex area, it is pointed out that the small channel pieces which are welded to the keel members have the same advantages as pointed out heretofore in connection with the channel pieces of FIGURE 12. The roller brackets which are supported on these channels are of simple L-shaped form and are fabricated from rolled steel using conventional techniques.

While the above mentioned brackets are of special shape, it is to be noted that the same kind of bracket is used uniformly in the trailer family; thus a single type of bracket is used in a variety of assemblies.

The structures for supporting the various rollers contribute to the over-all objective of having a trailer assembly comprising components which are relatively of simple shape and which can be advantageously and economically utilized in the fabrication of a trailer assembly and which are adaptable for use in a variety of trailer sizes.

Another important feature of the invention is the running light bracket structure. These brackets are indicated at 91 in FIGURE 1 and are shown in detail in FIGURE 15.

In FIGURE 15 the running light brackets include a foot member 92 which engages the outer surface of the side section 2 and extends beyond the top and bottom surfaces of the side member. These extensions are indicated at 93 and 94. The extensions are provided with apertures 95 and 96, the inner portions of which are substantially flush with the top and bottom surfaces of the side section. The apertures 95 and 96 accommodate a U-shaped bolt 100. The legs 101 and 102 of the bolt respectively engage the top and bottom surfaces of the side section 2 and project through the apertures 95 and 96. The bridge portion 103 of the U-bolt engages the inner surface of the side section 2. Conventional nut and washer means such as indicated at 104 are used to tightly engage the foot 92 and a U-bolt 100 with the side section 2.

A rectangular shaped arm 105 has its end cut off square to engage the flat surface of the foot 92. The foot 92 and arm 105 are secured together by welding at the engagement area, for example as indicated for the weld 106 which extends around the periphery of the arm 105.

The above described running light bracket structure has several important advantages. First of all the bracket is attached to the frame without the necessity of drilling holes and thus eliminating a source of stress concentration. Furthermore, the bracket is exceedingly strong but easily replaceable. The structure is superior to arrangements where the light bracket is directly welded to the frame or attached by bolt arrangements requiring holes in the frame. It has been found from experience that the conventional trailer owner uses the light bracket as a foot rest, particularly in hopping on and off the trailer during the loading and unloading of the boat and under these conditions severe loads can be imposed. Not only will the bracket take these loads, but even if damaged it can be removed and easily replaced or repaired.

The larger sized trailer shown in FIGURE 2 has the same structural features as described in connection with FIGURE 1 except that the tongue is pivotably connected with the frame and there is novel means for securing the running gear to the frame.

The preferred manner of pivotally securing the tongue 110 to the frame 111 is shown in detail in FIGURE 8 and FIGURE 9.

In FIGURE 8 and FIGURE 9 the tongue 110 has a yoke 112 which is welded to the end of the tongue as by the weld 113. The yoke carries a bushing 114 supporting a pin 115. The forward keel member 116 has a yoke 120 which is welded to the bottom surface as by the weld 121. This yoke 120 extends downwardly and envelopes the yoke 112. The pin 115 extends through appropriate apertures provided in the yoke 120. The pin has a head 122 and a threaded end 123 carrying the nut and washer arrangement 124, securing the yokes together and providing for the tongue 110 and its yoke 112 to swing or pivot with respect to the yoke 120 and the forward keel member 116.

With the pivotal arrangement the tongue is releasably secured to the frame at the apex area. Thus in FIGURE 3 the tongue 117 is connected to the frame as by the lock 118 which is of conventional form.

The novel means for securing the running gear and the frame of the trailer of FIGURE 2 will be described in connection with FIGURE 2 and FIGURE 14.

In FIGURE 2 channel members 125 and 126 respectively envelope the frame side sections 130 and 131. The two channel members 125 and 126 are identical in construction and are secured to the side sections in the same manner. The foregoing is best shown in FIGURE 14 wherein it will be observed that the channel member comprises an L-shaped section 132 and a planar section 133 which is welded thereto by the weld 134. The frame side section 130 has a plurality of apertures, and the channel also has apertures which can be aligned with the apertures in the side section. These apertures provide for the channel 125 to be shifted forwardly or rearwardly to adapt the trailer to different loading conditions. When the apertures are desirably aligned, nut and bolt arrangements such as indicated at 135 are used to tightly secure a channel to a side section. Each channel member carries conventional brackets such as brackets 137 which secure the channel to the leaf spring 138 of the running gear. The mud guards 139 are respectively welded to the channels 125 and 126.

The structure for interconnecting the running gear and the frame has several important advantages in addition to the weight compensation feature mentioned above. For example, it will be observed that the channels 125 and 126 constitute a cradle-like mechanism which supports the side sections over a substantial portion of their length. This has the effect of distributing the forces that are transferred as between the running gear and the frame. This avoids stress concentration, which is particularly important to minimize for rough running conditions. Furthermore the envelopment of the side sections over a substantial portion of the length of the side sections augments the rigidity characteristic of the frame in helping to avoid flexure. Another advantage of this interconnecting structure is that it is of simple form, and the members 125 and 126 can be easily fabricated using conventional tools and techniques.

The trailer structure shown in FIGURE 3 is similar to the structure of the trailer in FIGURE 2 except that certain additional structures have been incorporated to adapt the trailer for larger size boats.

In the main these additional features are the bunk bar assemblies indicated at 140, the bridge assemblies 141, and the bow roller assembly 142. These structural elements will be described below.

With respect to the bunk bar assemblies 140 the invention contemplates, for the larger size trailers, that the bunk bars be supported both on the forward and rear keel members. The structure for securing the bunk bars to the keel members 143 and 144 is indicated at 145. Each of these structures is identical and provides for the bunk bars to tilt in a sidewise direction.

The support structures 145 will be described in detail in connection with FIGURE 13.

In FIGURE 13 the bunk bar of the bunk bar assembly is indicated in the phantom lines 146. The forward keel member is indicated at 143. A vertically oriented channel piece 150 is welded to the keel member 143. The channel 150 has the same structure as the channel member 50 described in connection with FIGURE 12. Another channel piece 151 has legs 152 and 153 and bridge 154. The leg 152 is provided with the apertures 155. These apertures accommodate the weld studs 156 of the channel member 150. As will be apparent, the channel 151 is adjustable vertically.

The channel 151 is cut away to form the support arms 160 and 161. The support arms have apertures which accommodate a pivot bolt 162 rotatably supporting the bunk bar channel 163. The screws 164 secure the bunk bar to the channel. The cut away portion of the channel 150 is such that the terminus 165 is spaced from the pivot bolt 162 whereby the bunk bar channel has substantial pivoting action clockwise as shown in FIGURE 13.

The structure described in connection with FIGURE 13 has the same advantages as those pointed out in connection with the support mechanism described in connection with FIGURE 12.

The tongue roller support structure 142 will be described in connection with FIGURES 3 and 11.

Referring to FIGURE 11, a pair of side arms 170 and 171 are disposed on opposite sides of the tongue 117. These arms engage the side surfaces of the tongue and are provided with a plurality of apertures 174. A pair of pins 175 and 176 extend through aligned apertures in the arms and respectively engage the top and bottom surfaces of the tongue. By placing the pins in different apertures the angular orientation of the arms with respect to the tongue can be changed. The side arms 170 and 171 are held fast against the tongue by tightening up on the bolts 177 and 178. By loosening the side arms the support structure can be shifted on the tongue. The roller 180 is disposed between the arms 170 and 171 and is rotatably supported as by the bearings 181.

The trailer of FIGURE 3 has bridge bar assemblies 141 which are constructed similarly (except for size) as the bridge bar assemblies 182 for the trailer shown in FIGURE 4. Since these assemblies are identical in structure except for size, the description of the assemblies will be made in connection with the assembly 182 of the trailer of FIGURE 4.

As best seen in FIGURE 5 the assembly 182 comprises a rod-like member 183 which is bent into a generally angular shape and is spaced from the top surface of the side section 184. The ends of the rod 183 are flattened down and welded to the top surface of the side section as by the welds 185 and 186. In the center of the bar 183 is a post 187 which extends between the bar and the top surface of the side section. The post 187 is welded to the bar and the top surface.

The bridge bar assemblies in the trailer structures of FIGURES 3 and 4 are important structural elements which cooperate with the rectangular configuration of the frame in a manner to minimize the size of the frame while attaining maximum strength against flexure while the trailer is running under load. This minimizing of the size of the frame structure produces savings in material, savings in the cost of manufacture, and also savings in weight which is important from an operational standpoint.

The trailer in FIGURE 4 has additional structural features which suitably adapt it for operation for relatively large-sized boats. These additional structures are a bridge bar assembly 188 on the tongue 196, walk board arrangements 189 and 190, keel cross member 191, intermediate cross member 192, an underslung cross member 193, and forward stiffeners 194 and 195.

The bridge bar assembly 188 includes the rod-like member 200, the ends of which are respectively welded to the underside surface of the tongue and the center post 201 which extends between the center of the bar and the tongue and is respectively welded thereto.

The use of the bridge bar assembly on the tongue is of special value because it damps vibrations of frequencies most likely to occur under running conditions and acts as an anti-deflection member. The bridge bar assembly reduces the necessity for a tongue of large cross section which would otherwise be needed where the length is substantial.

The tongue structures mentioned heretofore are preferably formed from rectangular shaped tubing which has a square cross section. This is preferred over the configuration used in the other frame members, because the additional metal on the top and bottom sides of the tongue provides extra strength against sidewise deflection. It is contemplated that each of the tongues be fabricated in the same manner as the side and leg sections of the frame as described heretofore.

The intermediate cross member 192 extends between the side sections 184 and 185 and is welded thereto in a manner similar to the keel members 6 and 10 of FIGURE 1. It will be observed that this intermediate member carries a roller 202 which is supported in the same manner as the rollers 60 and 61 described in FIGURE 1.

The walk board assembly 189 includes the three walk boards 203, 204, and 205. As best seen in FIGURE 6, these walk boards are rectangular in cross section. Referring to FIGURE 5 the walk board 203 extends between the rear keel member 206 and the intermediate keel member 192, and the ends of the board are cut off square to make a large contact fit with these members and welded around the line of contact. The walk board 204 extends between the intermediate keel member 192 and the forward keel member 207 and is welded up similarly to the board 203. The walk board 205 extends between the forward keel member 207 and the leg 210 and is welded up similarly as described.

The walk boards in the group 190 are similarly arranged, and these are indicated at 211, 212, and 213.

The underslung cross member 193 is welded to the walk boards 204 and the rectangular structure of the walk boards and the manner of supporting the same on the frame forms an important feature of the invention. The rectangular configuration and the welding impart rigidity to the frame and are particularly beneficial in avoiding the effects of lateral side thrusts during the running of the trailer. Further it will be observed that the tops of the walk boards are substantially flush with the cross members and with the leg sections of the frame so that there is a smooth, uninterrupted surface for walking on the boards.

With reference to the bunk board assemblies 214 and 215 in FIGURE 4 it will be observed that these are mounted by supports 217 which are disposed respectively on the rear keel member 206, the intermediate member 193, and the forward keel member 207. These supports 217 are secured to the members in a manner similar to supports described in connection with FIGURE 13.

The frame structure of FIGURE 4 includes the forward stiffener members 194 and 195 which interconnect the forward keel member 207 and the leg sections 210 and 216. These stiffeners are of the same shape and are welded to the frame in the same manner as explained in connection with the rear stiffeners 13 and 14 of FIGURES 1 and 16.

Referring to FIGURE 3, the preferred structure of the means for mounting the winch will be explained.

The winch structure includes assembly 220. This assembly has foot 221 and U-bolts 222 which are of the same structure as the foot 94 and U-bolt 100 described in connection with FIGURE 15. Extending upwardly from the foot 221 is a post 223. This post is formed of the same rectangular shaped hollow metal tubing as the tongue 117. The lower edge of the post 223 is cut to make a substantial contact with the foot. The post is welded around the contact area. As will be observed the post extends away from the foot at an acute angle. On the top of the post is an assembly 224 including the base 225 and the U-bolts 226. This assembly is of the same structure as the assembly 220. Welded to the top of the base 225 is a winch arm 230 which extends generally parallel the tongue 117. A winch arm support bracket 231 extends between the base 225 and the arm 230. The ends of the support bracket are welded to the base and arm.

By loosening the bolts 226, the assembly 224 can be adjustably positioned on the post 223.

In connection with the word "rectangular" as used herein, it is to be understood that this refers to a tube whose side sections are of equal length; such as for example, the tubes forming the tongues. The term also applies to tubes of the kind forming the sides and leg sections of the frame; i.e., where two opposite sides are of greater length than the other two sides.

In connection with the frames for the trailers of FIGURES 1 to 4, it has been pointed out that the side and leg sections were formed from a single piece of rectangular shaped hollow metal tubing. It is contemplated for very large trailers; for example, trailers adapted to carry boats up to approximately 7,500 pounds and 30 feet in length, that the same basic frame configuration as shown in FIGURE 4 be employed except that the legs and side sections be formed of components which are welded together. In such a structure the side sections and the leg sections are separate, individual pieces welded together at the respective junctions. Furthermore, the leg sections are joined together at an apex area by means of a bridge the ends of which are respectively welded to the legs. The welding of the various components produces a unified, rugged frame structure. It will be understood that the larger size trailers are equipped with commensurately larger running gear.

We claim:
1. In a boat trailer, a frame comprising:
two parallel side sections and two leg sections respectively joined with an end of a side section and the leg sections extending toward one another and joined together at an apex area substantially midway between the side sections;
a rear keel member extending between the opposite ends of said side sections, the ends of the member being respectively welded to the inner surfaces of the side sections;
a forward keel member extending between said side sections, the ends of the forward keel member being respectively welded to the inner surfaces of the side sections adjacent the juncture between the leg sections and the side sections, said side sections, said leg sections, and said keel member all being formed of rectangular shaped hollow metal tubing;
a pair of plate-like stiffeners respectively disposed at the intersections of said side sections and said rear keel member, and the end of each stiffener being respectively welded to the inner surface of a side section and the inner surface of the keel member; and
a pair of bridge bar assemblies respectively disposed on the top surfaces of said side sections, each bridge bar assembly including a rod-like member spaced from its top surface except at its ends, said ends being welded to the top surface respectively adjacent the ends of the side section, together with a post extending between the center of the rod and the top surface and welded respectively thereto.
2. In a boat trailer, a frame comprising:
two parallel side sections and two leg sections respectively joined with an end of a side section and the leg sections extending toward one another and joined together at an apex area substantially midway between the side sections;
a rear keel member extending between the opposite ends of said side sections, the ends of the member being respectively welded to the inner surfaces of the side sections;
a forward keel member extending between said side sections, the ends of the forward keel member being respectively welded to the inner surfaces of the side sections adjacent the juncture between the leg sections and the side sections;

a pair of plate-like stiffeners respectively disposed at the intersections of said side sections and said rear keel member, and the ends of each stiffener being respectively welded to the inner surface of a side section and the inner surface of the keel member;

a pair of bridge bar assemblies respectively disposed on the top surfaces of said side sections, each bridge bar assembly including a rod-like member spaced from its top surface except at its ends, said ends being welded to the top surface respectively adjacent the ends of the side section, together with a post extending between the center of the rod and the top surface and welded respectively thereto; and an intermediate cross member disposed adjacent said rear keel member and extending between said side sections, the ends of the intermediate member being respectively welded to the inner surface of the side sections, said side sections, said leg sections, said keel member, and said intermediate member all being formed of rectangular shaped hollow metal tubing.

3. A construction in accordance with claim 2, further including a second pair of plate-like stiffeners respectively disposed at the intersections of said side sections and said leg sections and the ends of the stiffeners being welded respectively to the inner surface of a leg section and to the inner surface of the forward keel member.

4. In a boat trailer, a frame comprising:

two parallel side sections and two leg sections respectively joined with an end of a side section and the leg sections extending toward one another and joined together at an apex area substantially midway between the side sections;

a rear keel member extending between the opposite ends of said side sections, the ends of the member being respectively welded to the inner surfaces of the side sections;

a forward keel member extending between said side sections, the ends of the forward keel member being respectively welded to the inner surfaces of the side sections adjacent the juncture between the leg sections and the side sections;

a pair of plate-like stiffeners respectively disposed at the intersections of said side sections and said rear keel member, and the ends of each stiffener being respectively welded to the inner surface of a side section and the inner surface of the keel member;

a pair of bridge bar assemblies respectively disposed on the top surfaces of said side sections, each bridge bar assembly including a rod-like member spaced from its top surface except at its ends, said ends being welded to the top surface respectively adjacent the ends of the side sections, together with a post extending between the center of the rod and the top surface and welded respectively thereto;

an intermediate cross member disposed adjacent said rear keel member and extending between said side sections, the ends of the intermediate member being respectively welded to the inner surfaces of the side sections, said side sections, said leg sections, said keel member, and said intermediate member all being formed of rectangular shaped hollow metal tubing; and two groups of walk boards, there being three boards in each group and each group respectively being arranged as by the first board being disposed between said rear keel member and said intermediate member, the second board between said intermediate member and said forward keel member, and the third board being disposed between said forward keel member and one of said leg sections.

5. In a boat trailer, a frame comprising:

two parallel side sections and two leg sections respectively joined with an end of a side section and the leg sections extending toward one another and joined together at an apex area substantially midway between the side sections;

a rear keel member extending between the opposite ends of said side sections, the ends of the member being respectively welded to the inner surfaces of the side sections;

a forward keel member extending between said side sections, the ends of the forward keel member being respectively welded to the inner surfaces of the side sections adjacent the juncture between the leg sections and the side sections;

a pair of plate-like stiffeners respectively disposed at the intersections of said side sections and said rear keel member, and the ends of each stiffener being respectively welded to the inner surface of a side section and the inner surface of the keel member;

a pair of bridge bar assemblies respectively disposed on the top surfaces of said side sections, each bridge bar assembly including a rod-like member spaced from its top surface except at its ends, said ends being welded to the top surface respectively adjacent the ends of the side sections, together with a post extending between the center of the rod and the top surface and welded respectively thereto;

an intermediate cross member disposed adjacent said rear keel member and extending between said side sections, the ends of the intermediate member being respectively welded to the inner surfaces of the side sections, said side sections, said leg sections, said keel member, and said intermediate member all being formed of rectangular shaped hollow metal tubing;

two groups of walk boards, there being three boards in each group and each group respectively being arranged as by the first board being disposed between said rear keel member and said intermediate member, the second board between said intermediate member and said forward keel member, and the third board being disposed between said forward keel member and one of said leg sections; and an underslung cross member extending between said side sections and disposed below and welded to the underside of each of the second walk boards of said groups.

6. In a boat trailer, a frame comprising:

two parallel side sections and two leg sections respectively joined with an end of a side section and the leg sections extending toward one another and joined together at an apex area substantially midway between the side sections;

a rear keel member extending between the opposite ends of said side sections, the ends of the member being respectively welded to the inner surfaces of the side sections;

a forward keel member extending between said side sections, the ends of the forward keel member being respectively welded to the inner surfaces of the side sections adjacent the juncture between the leg sections and the side sections, said side sections, said leg sections, and said keel member all being formed of rectangular shaped hollow metal tubing;

a pair of plate-like stiffeners respectively disposed at the intersections of said side sections and said rear keel member, and the end of each stiffener being respectively welded to the inner surface of a side section and the inner surface of the keel member;

a pair of bridge bar assemblies respectively disposed on the top surfaces of said side sections, each bridge bar assembly including a rod-like member spaced from its top surface except at its ends, said ends being welded to the top surface respectively adjacent the ends of the side section, together with a post extending between the center of the rod and the top surface and welded respectively thereto; and an elongated tongue disposed to extend from forward keel member to said apex area and thence outwardly therefrom, the tongue being formed of rectangular shaped hollow metal tubing.

7. In a boat trailer, a frame comprising:

two parallel side sections and two leg sections respectively joined with an end of a side section and the leg sections extending toward one another and joined together at an apex area substantially midway between the side sections;

a rear keel member extending between the opposite ends of said side sections, the ends of the member being respectively welded to the inner surfaces of the side sections;

a forward keel member extending between said side sections, the ends of the forward keel member being respectively welded to the inner surfaces of the side sections adjacent the juncture between the leg sections and the side sections, said side sections, said leg sections, and said keel member all being formed of rectangular shaped hollow metal tubing;

a pair of plate-like stiffeners respectively disposed at the intersections of said side sections and said rear keel member, and the ends of each stiffener being respectively welded to the inner surface of a side section and the inner surface of the keel member;

a pair of bridge bar assemblies respectively disposed on the top surfaces of said side sections, each bridge bar assembly including a rod-like member spaced from its top surface except at its ends, said ends being welded to the top surface respectively adjacent the ends of the side section, together with a post extending between the center of the rod and the top surface and welded respectively thereto;

an elongated tongue disposed to extend from forward keel member to said apex area and thence outwardly therefrom, the tongue being formed of a rectangular shaped hollow metal tubing; and a bridge bar assembly disposed on the underside of said tongue, the assembly including a rod-like member spaced from the tongue underside except at its ends, said ends being respectively welded to the tongue underside together with a post extending between the center of the rod and said tongue underside.

8. In a boat trailer, the subcombination comprising:

a frame member having a vertically oriented flat surface;

a vertically oriented channel piece, the edges of the legs of which engage said flat surface and are welded thereto;

a plurality of weld studs the heads of which are welded to the bridge of the channel and the legs of which extend outwardly from the bridge;

a second channel piece having a plurality of apertures formed in its bridge, the apertures accommodating the legs of said weld studs, and the bridges of said channels being in engagement;

nut means on the legs of said studs and securing said channels together;

a portion of the bridge of said second channel piece being cut away whereby the legs of the channel form two support arms;

a bunk bar disposed in the space between said support arms; and means pivotably supporting the bunk bar in the support arms, the pivot means being offset from the plane of the bridge of the second channel, and the terminus of the cut away portion of the bridge forming an abutment engaging the bunk bar to limit the pivot action of the bunk bar in one direction to a substantially horizontal orientation.

9. In a boat trailer, the subcombination comprising:

a frame member having a vertically oriented flat surface;

a vertically oriented channel piece, the edges of the legs of which engage flat said surface and are welded thereto;

a plurality of weld studs the heads of which are welded to the bridge of said piece and the legs of which extend outwardly from the bridge;

a second channel piece having a plurality of apertures formed on one leg, the apertures accommodating the legs of said studs and said apertured leg and the bridge of the first channel piece engaging one another;

nut means on the legs of said studs and securing said leg and bridge together;

a portion of the bridge of said second channel piece being cut away whereby the legs of the channel form two support arms;

a bunk bar channel disposed in the space between said support arms; and means pivotably supporting the bunk bar channel on the support arms, the pivot means being offset from the plane of the bridge of the second channel piece and the terminus of the cut away section being separated from said pivot means to provide for the terminus to accommodate substantial pivotal action of the bunk bar channel from a horizontal position.

10. In a boat trailer, the subcombination comprising:

a frame member having a vertically oriented flat surface;

a first vertically oriented channel piece, the edges of the legs of which engage said flat surface and are welded thereto;

a plurality of weld studs the heads of which are welded to the bridge of said channel piece and the legs of which extend outwardly from the bridge;

a second vertically oriented channel piece, the edges of which engage said flat surface and are welded thereto;

a plurality of weld studs the heads of which are welded to the bridge of said second channel piece and the legs of which extend outwardly from the bridge;

a first roller bracket engaging the bridge of said first channel piece and having a slot accommodating the legs of the studs of the first channel piece;

nut means on the legs of the studs of the first channel piece and securing said bracket against the bridge of the first channel piece;

a second roller bracket engaging the bridge of said second channel piece and having a slot accommodating the legs of the studs of said second channel piece;

nut means on the legs of the studs of said second channel piece and holding the bracket against the bridge of the second channel piece;

a roller disposed between said bracket; and means supporting the roller on the bracket.

11. In a boat trailer, the subcombination comprising:

a frame including two spaced apart leg sections extending toward each other and joined at an apex area, each leg section having a vertically oriented flat surface;

a pair of L-shaped brackets, the foot of each respectively engaging said flat surface and being welded thereto, and the legs of each bracket respectively extending toward one another and lying in a common plane;

a pair of roller supports respectively engaged with the legs of said brackets and each bracket being formed with a slot accommodating the legs of the stud;

nut means respectively disposed on the legs of said studs and securing said roller supports to said legs;

a roller disposed between said supports; and means supporting the roller on said supports.

(References on following page)

References Cited

UNITED STATES PATENTS

| | | | |
|---|---|---|---|
| 2,821,315 | 1/1958 | Bucher | 214—84 |
| 3,057,492 | 10/1962 | Chrystler | 214—84 |
| 3,069,038 | 12/1962 | Ahlbin | 214—84 |
| 3,077,998 | 2/1963 | Balko et al. | 214—84 |
| 3,082,892 | 3/1963 | Cox | 214—84 |
| 3,104,770 | 9/1963 | Calkins et al. | 214—84 |
| 3,122,245 | 2/1964 | Mackusick et al. | 214—84 |
| 3,176,865 | 4/1965 | Faul et al. | 214—84 |
| 3,180,510 | 4/1965 | Moller | 214—50 |

ALBERT J. MAKAY, *Primary Examiner.*